United States Patent
Plummer

(10) Patent No.: US 7,084,741 B2
(45) Date of Patent: Aug. 1, 2006

(54) METHOD FOR COMMUNICATION BETWEEN A FIRST STATION AND A SECOND STATION, AND A CONTROLLER AND REMOTE STATION USING THE COMMUNICATION METHOD

(75) Inventor: Allan P. Plummer, Balcatta (AU)

(73) Assignee: Signal Data Systems PTY, Ltd., Western Australia (AU)

( * ) Notice: Subject to any disclaimer, the term of this patent is extended or adjusted under 35 U.S.C. 154(b) by 235 days.

(21) Appl. No.: 09/944,119

(22) Filed: Sep. 4, 2001

(65) Prior Publication Data

US 2002/0053970 A1    May 9, 2002

(30) Foreign Application Priority Data

Sep. 4, 2000   (AU) ...................................... PQ9881
Sep. 15, 2000  (AU) ...................................... PR0158

(51) Int. Cl.
*G05B 11/01*   (2006.01)

(52) U.S. Cl. ............................ 340/310.11; 340/870.18; 375/259

(58) Field of Classification Search ............................... 340/310.01–310.08, 502, 504, 870.18, 870.19, 340/870.23, 310.11–310.18; 375/259; 700/17, 700/83; 137/551
See application file for complete search history.

(56) References Cited

U.S. PATENT DOCUMENTS

| | | | | |
|---|---|---|---|---|
| 3,818,466 | A * | 6/1974 | Honda | 340/517 |
| 4,131,882 | A * | 12/1978 | Hollabaugh et al. | 340/310.01 |
| 4,176,395 | A * | 11/1979 | Evelyn-Veere et al. | 700/284 |
| 4,348,582 | A * | 9/1982 | Budek | 219/483 |
| 4,400,688 | A * | 8/1983 | Johnston et al. | 340/310.02 |
| 4,684,920 | A * | 8/1987 | Reiter | 340/310.01 |
| 4,985,666 | A | 1/1991 | Nakabayashi | 318/434 |
| 4,988,972 | A * | 1/1991 | Takagi | 340/310.02 |
| 5,079,924 | A | 1/1992 | van der Broeck et al. | 62/6 |
| 5,493,267 | A * | 2/1996 | Ahlse et al. | 340/310.02 |
| 5,552,683 | A | 9/1996 | Dargent | 318/287 |
| 6,005,316 | A | 12/1999 | Harris | 310/90.5 |
| 6,097,761 | A * | 8/2000 | Buhring et al. | 375/257 |
| 6,229,432 | B1 * | 5/2001 | Fridley et al. | 340/310.01 |
| 6,622,933 | B1 * | 9/2003 | Young et al. | 239/66 |
| 2002/0033709 | A1 | 3/2002 | Plummer | 324/765 |

FOREIGN PATENT DOCUMENTS

| AU | 89555/98 | 5/1999 |
|---|---|---|
| AU | 733334 | 5/2001 |

* cited by examiner

Primary Examiner—Phung T. Nguyen
(74) Attorney, Agent, or Firm—Nixon & Vanderhye, PC

(57) ABSTRACT

A method for communicating between a first station and a second station over a wire pair, in which the first station sends an alternating power signal over the wire pair, the alternating power signal comprising a plurality of communication symbols, the second station receiving the alternating power signal and determining therefrom the communication symbols, the second station drawing current from the alternating power signal in a sequence corresponding to at least one further communication symbol, and the first station determining the current drawn in the alternating power signal to recover the further communication symbol.

57 Claims, 2 Drawing Sheets

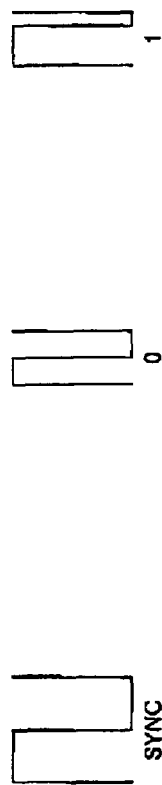
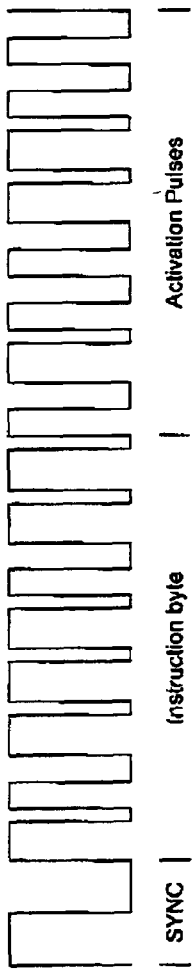
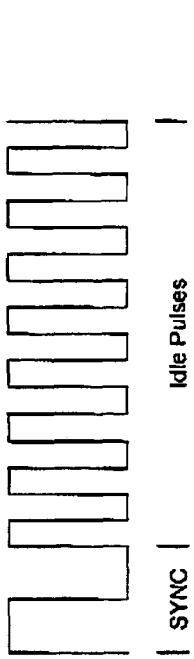
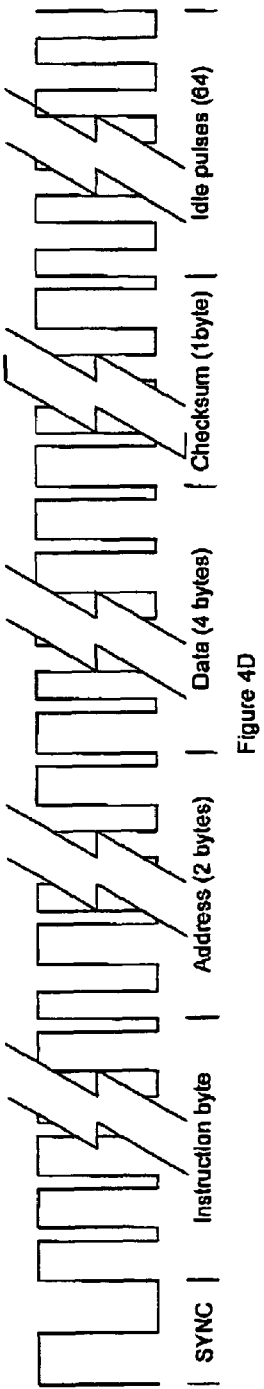

METHOD FOR COMMUNICATION BETWEEN A FIRST STATION AND A SECOND STATION, AND A CONTROLLER AND REMOTE STATION USING THE COMMUNICATION METHOD

FIELD OF THE INVENTION

This invention relates to a method for communication between a first station and a second station, and to a controller and remote station using the communication method. The invention is particularly useful in the field of irrigation systems, however the invention may also be applied to other fields.

BACKGROUND ART

In many areas of the world the availability of water to maintain the natural growth of plants is either insufficient or unreliable, especially if the plants are not native to the area. For centuries this problem has been overcome by the development of irrigation systems where water is transferred from a local available source such as a river, dam or bore and used to artificially irrigate the plants.

The twentieth century has seen the further development of irrigation systems to the level of total computerised automation. This has resulted in many areas of the world having large tracts of previously unusable arid land that are now capable of producing crops of all types.

A typical irrigation system comprises of a network of underground pipes along which water is pumped. Selected valves at strategic points on this network, when activated, release water to local distribution points such as sprinklers or drippers. The method of activating these valves may vary, but typically they would be triggered by electrical, mechanical, hydraulic or manual means.

The most common electrical device is an electro-mechanical solenoid. An activating current causes the solenoid to move a spring-loaded plunger, allowing the valve to open due to the water pressure in the irrigation pipes. When this current is either removed or possibly reversed, the plunger returns to its original state thus allowing the valve to close.

The solenoids are activated, either directly or remotely, by an electrical or electronic control systems such as irrigation controllers, programmable logic controllers (PLC's) or even manual switches.

The most common form of irrigation solenoid is activated on application of a voltage of 24 volts AC. Other solenoids activate on a range of different voltages from 6 to 48 volts, either being AC or DC. In order to minimise power consumption, latching solenoids are available which enable on the receipt of a voltage pulse of one polarity and disable when a voltage pulse of the reverse polarity is received.

The typical means of transferring the current required to activate these solenoids is a pair of cables running for distances of up to two kilometers from the controlling system. The limitations on this distance are dependent on the resistance of the cable such that sufficient power is available to activate the solenoid for the required time.

Commercial irrigation sites such as farms, parks or golf courses can cover large areas, consequently the length of cabling required to service all the solenoids may run to many kilometers. Currently there are two main techniques in use to distribute power to the solenoids, referred to as 'Direct Connection' and 'Two-Wire'. A brief description of these techniques follows.

Direct connection is the older or more traditional method, which is to supply power directly from an activating relay (or similar electronic device) within a control system by a directly connected pair of cables. It should be noted that the word 'pair' only refers to the connection point at the solenoid, as the typical wiring layout of such an installation is normally a matrix of single cables with the 'pairs' only occurring at the required solenoid junction locations.

Two-wire systems provide both power and activating commands along a single network. This network is generally consists of a true 'pair' of cables and each solenoid within the network is activated by a corresponding decoder connected between it and the network. A master irrigation controller powers and issues commands to the decoders via the pairs of cables. The format of the command communications depends on the manufacturer's preference. Many existing systems utilise tone or DTMF (Telephone-type tones) signals superimposed on the powering voltage. Normally (and preferably) the network is wired in a 'point to point' configuration between the master irrigation controller and the decoders.

Most control systems activate solenoids by applying a 24v AC 50 Hz RMS power signal to the solenoid. Although this technique appears both obvious and simple, a number of problems and limitations do occur.

A typical solenoid used requires around 3 watts at 24v AC to hold in, resulting in a holding current of around 300 mA. When the solenoid is activated, the inrush current can be double (or more) the holding current. The inrush current must be maintained until the plunger has fully seated.

One example of inrush current increases in duration is where a solenoid plunger is clogged with sediment or sand. On activation, if the force of the solenoid is not sufficient to move the clogged plunger, the plunger would vibrate violently at the waveform frequency and could take a number of seconds to activate. In this case the instantaneous inrush current would have to be maintained for far longer periods before the solenoid would be fully activated. If this solenoid was being activated some distance from the voltage source (the irrigation controller) or if other solenoids were also being activated which used common cabling runs, the resistance of the wire could cause the following scenarios to occur:

The solenoid would not activate.

The voltage drop and solenoid-induced interference at the decoder could be sufficient to cause the decoder electronics to reset, fail, or run unreliably.

If the irrigation controller is equipped with current sensing, it could shut down the section being irrigated and skip to the next section.

The current drawn (under worst cases) could cause a fuse to blow or trip at the irrigation controller. In this case irrigation could be suspended or cancelled.

Disregarding back-EMF voltages and other considerations, it may generally be assumed that when a solenoid is activated by an AC sinusoidal voltage the maximum amount of current flow occurs at the 90 and 270 degree points of the waveform, with the zero cross (no current drawn) occurring at the 0 and 180 degree points.

As more solenoids are activated simultaneously, the current draw will consequently increase. If two solenoids are activated with similar characteristics then the current draw will almost double, The difference will depend on the resistance and length of the supplying cable. Currently most two-wire systems start to become unreliable when operating multiple solenoids over distances exceeding one or two kilometers (utilising standard irrigation cabling). Some manufacturers overcome this problem by specifying thicker or custom manufactured cabling, which greatly increases the cost of the installation.

DISCLOSURE OF THE INVENTION

Throughout the specification, unless the context requires otherwise, the word "comprise" or variations such as "comprises" or "comprising", will be understood to imply the inclusion of a stated integer or group of integers but not the exclusion of any other integer or group of integers.

In accordance with a first aspect of this invention, there is provided a method for communicating between a first station and a second station over a distribution medium, comprising the steps of:

The first station sending an alternating power signal over the distribution medium, the alternating power signal comprising a plurality of communication symbols;

The second station receiving the alternating power signal and determining therefrom the communication symbols;

The second station drawing current from the alternating power signal in a sequence corresponding to at least one further communication symbol;

The first station determining the current drawn in the alternating power signal to recover the further communication symbol.

Preferably, the alternating power signal has a substantially square wave-form, and has substantially equally proportions of positive and negative components, averaged over time.

Preferably, the step of the second station drawing current comprises the second station drawing current during a positive component and a negative component of the alternating power signal.

Preferably, the second station is arranged to draw current during the positive component of the alternating power signal in a sequence corresponding to at least one further communication symbol, and to repeat said current draw in the negative component of the alternating power signal.

Preferably, the second station is arranged to draw current during a substantially centrally located portion of the positive component and negative component of the alternating power signal.

Preferably, the second station is arranged to draw current adjacent each rising edge and falling edge of the alternating power signal.

Preferably, the step of the second station drawing current further comprises the second station not deriving power from the alternating power signal for other purposes while drawing current corresponding to said at least one further communication symbol.

Preferably, the communications symbols comprise '1', '0', 'idle', and 'sync'.

Preferably, the '0' symbol is represented by equal portions of positive and negative components in the alternating power signal, and the '1' symbol is represented by unequal portions of positive and negative components in the alternating power signal, and the proportion of positive and negative components in the alternating power signal representing a '1' symbol is alternated each time a '1' symbol is sent.

Preferably, the plurality of communication symbols form a stream, selected from one of:

A command stream comprising a sync symbol, an instruction byte, and a plurality of station instructions;

An idle stream comprising a sync symbol, and a plurality of idle symbols;

A instruction stream, comprising a sync symbol, an instruction byte, a station address, and station data.

Preferably, there are a plurality of second stations, each second station having an address, each second station responsive to station instruction/data at a position in the command stream corresponding to their address, and said step of each second station drawing current comprises each second station drawing current during an idle pulse at a position in the command stream corresponding to their address.

Preferably, one said instruction byte corresponds to an instruction to activate or deactivate each remote station, each second station activating or deactivating according to the corresponding station instruction is a '1' symbol or a '0' symbol, respectively.

Preferably, each second station is arranged to count the number of other second stations that have been activated before it, and to activate at an offset from said sync pulse corresponding to said number of other second stations.

In accordance with a second aspect of this invention, there is provided an apparatus for communicating with at least one second station over a distribution medium, comprising:

Means for providing an alternating power signal over the distribution medium, the alternating power signal comprising a plurality of communication symbols; and Control means arranged determine current draw in the alternating power signal to recover at least one further communication symbol from a second station.

Preferably, the means for providing an alternating power signal comprises a power switching circuit connected to and operating under control of the control means, the power switching circuit operable to provide an alternating power signal over said distribution medium.

Preferably, the power switching circuit is arranged to provide an alternating power signal that has a substantially square waveform, and has substantially equally proportions of positive and negative components, averaged over time.

Preferably, the communications symbols comprise '1', '0', 'idle', and 'sync'.

Preferably, the '0' symbol is represented by equal portions of positive and negative components in the alternating power signal, and the '1' symbol is represented by unequal portions of positive and negative components in the alternating power signal, and the proportion of positive and negative components in the alternating power signal representing a '1' symbol is alternated each time a '1' symbol is sent.

Preferably, the control means is arranged to control the power switching circuit to form the alternating power signal from a plurality of communication symbols forming a stream, selected from one of:

A command stream comprising a sync symbol, an instruction byte, and station instructions;

An idle stream comprising a sync symbol, and a plurality of idle symbols;

A instruction stream, comprising a sync symbol, an instruction byte, a station address, and station data.

Preferably, the control means is arranged to determine current draw during a substantially centrally located portion in each positive component and negative component of the alternating power signal.

Preferably, the control means is arranged to determine current draw adjacent each rising edge and falling edge of the alternating power signal.

In accordance with a third aspect of this invention, there is provided an apparatus for communicating with a first station over a distribution medium, comprising:

Means for receiving an alternating power signal comprising a plurality of communication symbols over the distribution medium, and for recovering the communication symbols therefrom; and Control means arranged to draw current from the alternating power signal in a sequence corresponding to at least one further communication symbol.

Preferably, the control means is arranged to draw current during a positive component and a negative component of the alternating power signal.

Preferably, the control means is arranged to draw current during the positive component of the alternating power signal in a sequence corresponding to at least one further communication symbol, and to repeat said current draw in the negative portion of the alternating power signal.

Preferably, the second station is arranged to draw current during a substantially centrally located section in a positive component and negative component of the alternating power signal.

Preferably, the second station is arranged to draw current adjacent each rising edge and falling edge of the alternating power signal.

Preferably, second station is arranged not to derive power from the alternating power signal during the prescribed section other than the current draw.

Preferably, the means for recovering is arranged to recover a plurality of communication symbols forming a stream, and to decode said stream into one of:

A command stream comprising a sync symbol, an instruction byte, and station instructions;

An idle stream comprising a sync symbol, and a plurality of idle symbols;

A instruction stream, comprising a sync symbol, an instruction byte, a station address, and station data.

Preferably, said apparatus has an address, said means for recovering being responsive to station instruction/data at a position in the command stream corresponding to the address, said control means arranged to draw current during an idle pulse at a position in the command stream corresponding to the address.

Preferably, said control means is arranged to count the number of other apparatus that have been activated before it, and to activate at an offset from said sync symbol corresponding to said number of other apparatus.

In accordance with a fourth aspect of this invention, there is provided a method for controlling a plurality of second stations, comprising the steps of:

Distributing power to the second stations via a distribution medium;

Distributing a reference datum to said second stations; and

Activating said second stations at a prescribed offset from the reference datum.

Preferably, the alternating power signal has a substantially square wave-form, and has substantially equally proportions of positive and negative components, averaged overtime.

Preferably, the step of distributing a reference datum further comprises the step of distributing a plurality of activation marks after the reference datum.

Preferably, the reference datum comprises a predetermined sequence of positive and negative components in the alternating power signal.

Preferably, the activation marks comprise a further predetermined sequence of positive and negative components in the alternating power signal after the reference datum.

Preferably, the step of activating second stations comprises the step of sending instructions to each second station whether or not to activate embedded in said activation marks.

In accordance with a fifth aspect of this invention, there is provided an apparatus for controlling a plurality of second stations connected to the apparatus by a distribution medium, the apparatus comprising:

Means for providing power to the second stations via a distribution medium; and

Control means arranged to provide a reference datum to the second stations and to instruct each second station to activate, each second station responsive to the instruction to activate at a prescribed offset from the reference datum.

Preferably, the means for providing power comprises a power switching circuit connected to and operating under control of the control means, the power switching circuit operable to provide an alternating power signal over said distribution medium.

Preferably, the power switching circuit is arranged to produce an alternating power signal that has a substantially square wave-form, and has substantially equally proportions of positive and negative components, averaged over time.

Preferably, the control means is further arranged to provide a plurality of activation marks after the reference datum.

Preferably, the control means is arranged to provide the reference datum by controlling the power switching circuit to produce a predetermined sequence of positive and negative components in the alternating power signal.

Preferably, the control means is arranged to provide the activation marks by controlling the power switching circuit to produce a further predetermined sequence of positive and negative components in the alternating power signal after the reference datum.

Preferably, the control means is arranged to provide instructions to each second station by controlling the power switching circuit to produce a prescribed sequence of alternating positive and negative components in the alternating power signal as the activation marks, each activation mark corresponding to an instruction to a second station whether or not to activate.

BRIEF DESCRIPTION OF THE DRAWINGS

Two embodiments of this invention will now be described, by way of example, with reference to the accompanying drawings, in which:

FIG. 4a shows wave forms of a "synchronisation" pulse, a "zero" pulse and a "one" pulse used by the controller in FIG. 1;

FIG. 4b shows an example command stream;

FIG. 4c shows an example idle stream; and

FIG. 4d shows an example individual stream.

BEST MODE(S) FOR CARRYING OUT THE INVENTION

The first embodiment will be described with reference to a controller and remote stations used in an irrigation system, however it should be appreciated that the invention may well have application in other areas.

Figure 1:
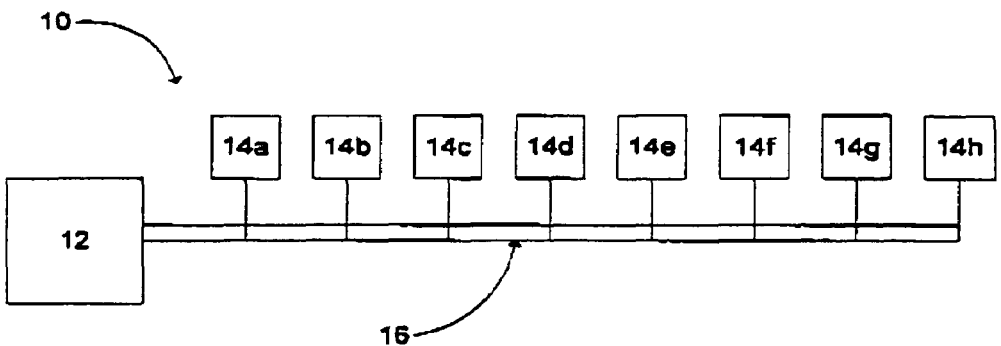
FIG. 1 shows a system of a controller and remote stations in accordance with the preferred embodiment of this invention.

FIG. 1 shows the system 10 comprising a controller 12 and eight remote stations 14a–14h.

The remote stations 14a–14h are connected to the controller 12 by a pair of wires 16. The remote stations 14a–14h are connected in parallel across the pair of wires 16.

In the embodiment, the remote stations 14a–14h comprise a decoder 18 and a solenoid 20 which, when activated, irrigates an area of land. Although the embodiment is described with reference to a single pair of wires 16 and eight remote stations, it should be appreciated that the number of remote stations will vary according to the area of land to be irrigated.

Figure 2:
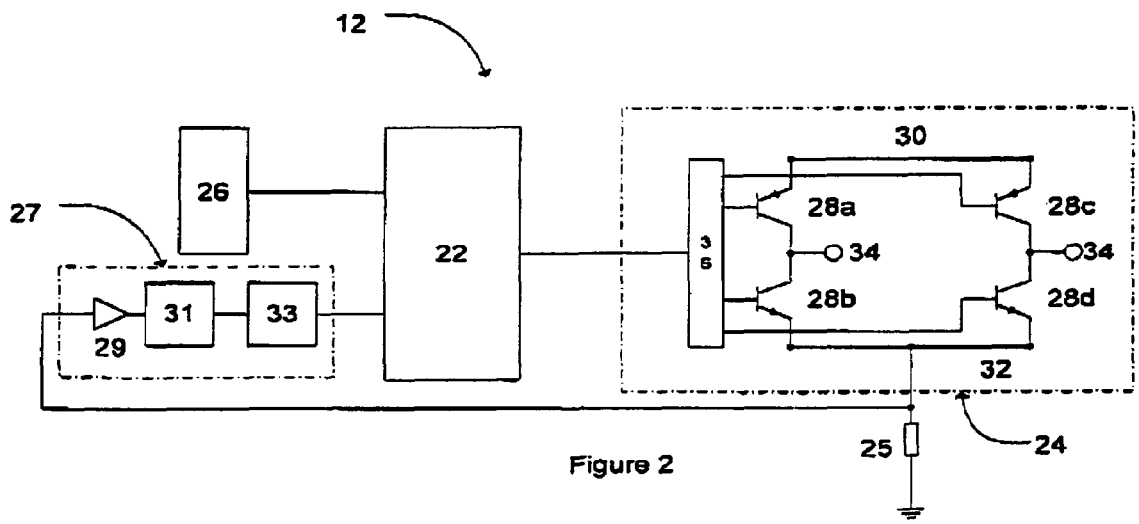
FIG. 2 shows a block diagram of the controller shown in FIG. 1.

FIG. 2 shows a block diagram of the controller 12, comprising a microprocessor and associated memory 22, a power circuit 24 connected to the microprocessor 22 and an interface 26 connected to the microprocessor 22.

The power circuit 24 comprises an H-Bridge circuit in the embodiment formed from four power MOSFETs 28a–28d. The power MOSFETs 28a and 28b are connected in series between a power rail 30 and a second rail 32 that is connected to ground via a resistor 25. The power MOSFETs 28c and 28d are also connected in series between the power rail 30 and the second rail 32, in parallel with the power MOSFETs 28a and 28b. A pair of terminals 34 are provided, one connected between the power MOSFETs 28a and 28b, and one connected between the power MOSFETs 28c and 28d, as shown in FIG. 2. The terminals 34 are connected to the pair of wires 16. By activating the power MOSFETs 28a and 28d, and then alternately activating the power MOSFETs 28c and 28b, and alternating power signal is provided on the pair of wires 16. The power MOSFETs 28a–28d are activated under control of the microprocessor 22 via appropriate bias circuitry 36. The interface 26 is an RS-232 serial interface in the embodiment to allow the microprocessor 22 to receive instructions from an external source if desired.

The controller 12 further comprises a symbol recovery circuit 27 comprising an amplifier 29, a filter 31 and hysteresis circuit 33. The input of the amplifier 29 is connected to the second rail 32, and accordingly the voltage at the input of the amplifier 29 is equal to that across the resistor 25, which is proportional to the current being drawn by the power circuit 24. The output of the amplifier is connected to the filter 31, the output of which is connected to the hysteresis circuit 33. The hysteresis circuit 33 acts to disconnect step tunes as in the current drawn from the power circuit 24. The output of the hysteresis circuit is input to the microprocessor 22.

The symbol recovery circuit 27 detects communication symbols imposed on the alternating power signal by remote stations as will be described in further detail below.

Figure 3:
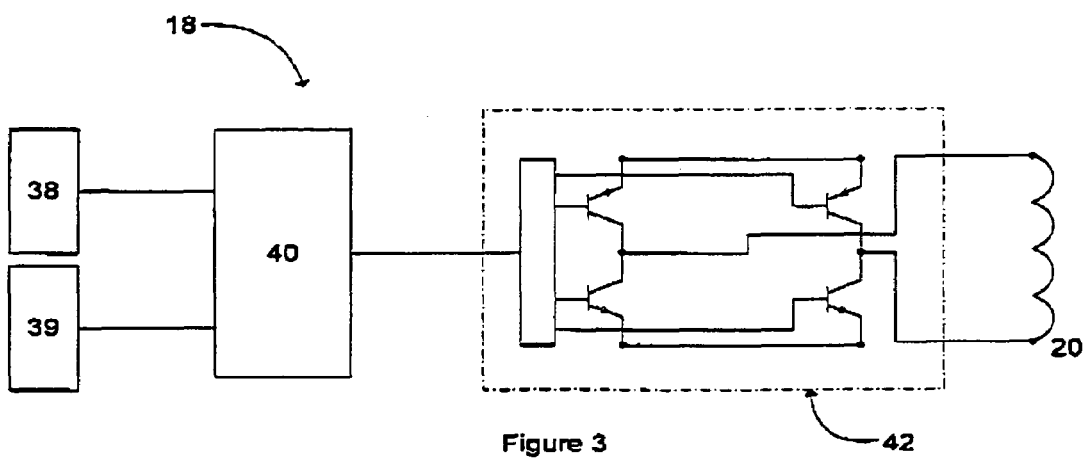
FIG. 3 is a block diagram of a remote station shown in FIG. 1.

FIG. 3 is a block diagram of one of the remote stations 14a–14h. Each of the remote stations 14a–14h are of the same general form as shown in FIG. 3.

Each remote station comprises a decoder 18 formed from a power and zero crossing circuit 38, a microprocessor and associated memory 40 and a power generation circuit 42.

The power and zero crossing circuit 38 is connected to the pair of wires 16. The power and zero crossing circuit 38 produces a local power supply from the alternating power signal on the pair of wires 16 for use by the microprocessor 40 and the power generation circuit 42. The power and zero crossing circuit 38 also produces a signal indicating when the alternating power signal changes polarity, which is input to the microprocessor 40.

The power generation circuit 42 operates under control of the microprocessor 40 to provide power to the solenoid 20 in accordance with instructions received from the controller 12 as will be described below. The power generation circuit 42 is of the same form as the power circuit 24 of the controller 12.

The decoder 18 further comprises a current drawing circuit 39 that is connected to the pair of wires 16 and to the microprocessor 40. The current drawing circuit 39 operates under instruction from the microprocessor 40 to draw a predetermined amount of current from the alternating power signal. In the embodiment, the current drawing circuit 39 is arranged to draw 100 milliamps of current. This allows the decoder 18 to communicate with the controller 12 as will be described in further detail below.

The controller 12 communicates with the decoders 18 in each remote station 14a–14h by composing the alternating power signal from combinations of communication symbols. The examples of the communication symbols used in the embodiment are shown in FIG. 4a.

FIG. 4a shows examples of a synchronisation pulse or synch pulse, a "zero" (or idle) pulse and a "one" pulse. In this embodiment, the synchronisation pulse is twice the width of the zero and one pulses.

The microprocessor 22 of the controller 12 operates to control the power circuit 24 to produce the alternating power signal formed from communication symbols to form command streams of the communication symbols. In the embodiment, the microprocessor 22 is arranged to produce one of three types of streams, which are shown in FIGS. 4b–4d.

The first type of stream, referred to as a command stream, comprises a sync pulse, followed by an instruction byte, followed by eight activation pulses, one for each of the remote stations 14a–14h. In other embodiments, the number of activation pulses following the instruction byte would be varied according to the number of remote stations, or alternatively a fixed number greater than the number of remote stations may be used, such as 100.

In the command stream shown in FIG. 4b, the instruction byte determines the nature of the instruction given to the remote stations, and the activation pulses indicate which of the remote stations 14a–14h are to follow the instruction. Each of the activation pulses is either a zero or a one pulse, each of which addresses one particular remote station 14a–14h according to an addressing technique that will be described below.

The microprocessor 40 of each decoder 18 in the remote stations is arranged to detect the presence of a synchronisation pulse. It then compares the following value of the instruction byte with a stored value, and if the two are the same, the microprocessor 40 knows that the following activation pulses are commands to particular remote stations. Each remote station is then arranged to listen to all of the following pulses and to keep account of the number of pulses that have occurred. Each decoder has an address stored in the memory associated with the microprocessor 14 corresponding to the position of the pulse following the instruction byte that the decoder will take as its instruction. For example, if the decoder has an address of numeral 4, it will take the fourth activation pulse after the instruction byte as being its instruction.

In the embodiment, the instruction byte has a value greater than 128, such that the first bit in the instruction byte is a one. The instruction given by the controller 12 in the embodiment is to activate the solenoid 20 attached to each decoder on or off. For example, an activation pulse being a zero will correspond with an instruction to the remote station to switch off its solenoid 20, and an activation pulse being a one pulse corresponds with an instruction to that remote station to switch on its solenoid.

The second stream that the controller 12 can produce is shown in FIG. 4c, which is referred to as an idle stream. The idle stream comprises a synchronisation pulse followed by a series of eight idle pulses. In a similar manner to the activation pulses described in relation to FIG. 4b, the number of idle pulses may be set according to the number of remote stations, or a fixed number greater than the number of remote stations may be used, such as 100.

The microprocessor 40 of each decoder 18 is arranged to determine the presence of the synchronisation pulse as previously described. If the following pulse is an idle pulse, the microprocessor 14 recognises the stream as an idle stream. Each decoder is then arranged to count the number of idle pulses and upon the commencement of the idle pulse corresponding to its address, the microprocessor 40 instructs the current drawing circuit 39 to switch on and off in a pattern similar to those in the zero and one pulses. However, the current drawing circuit 39 does not generate a signal directly on to the pair of wires 16, but rather draws power from the alternating power signal to form a communication byte. In the embodiment, the microprocessor 40 is arranged to draw power from the alternating power signal via the current drawing circuit 39 on both the positive and the negative components of the idle pulse corresponding to its address.

In the embodiment, each decoder is arranged to produce a one byte status indication by drawing current in the positive and negative components of the idle pulse corresponding to its address. By signing appropriate identifiers to predetermine statuses, status information such as whether the remote station is currently on or off, and whether a voltage condition exists can be communicated from each remote station to the controller 12.

The microprocessor 22 of the controller 12 recovers the status bytes from each remote station 14a–14h according to information received from the circuit 27.

Advantageously, because the communications from the remote stations to the controller 12 use a current draw mechanism these communications do not interfere with the instructions from the controller to the remote stations. Further, even if one of the remote stations fails such that its current draw mechanism is permanently switched on, this will still not affect the communications from the remote stations to the controller 12, since the controller 12 detects sudden changes in current in order to recover the communication signals, thus, the communication system is robust. Further, the communication system is also efficient with the idle stream and command streams allowing the controller 12 to receive status information from all of the remote stations and to issue instructions to all of the remote stations in a relatively rapid manner. In contrast, previous systems have relied on instructions to each individual remote station, which can take a significant amount of time when a large number of remote stations are used.

The microprocessor 22 of the controller 12 is also able to produce a third type of stream shown in FIG. 4d which is referred to as an individual stream. The stream comprises a sync pulse followed by a command byte, followed by a two byte address in binary coded decimal, followed by a four byte data portion and a one byte check sum. The stream also comprises 64 idle pulses following the check sum. The address in the individual stream corresponds with an address of a decoder. The individual stream allows the controller 12 to issue instructions to a specific decoder, which allows more advanced facilities such as reprogramming a remote station's address or other parameters stored in the decoder, along with querying a particular remote station on the source of a fault or other situation. Thus, the communication system allows efficient and robust communications for the vast majority of communications with specific instructions sent to individual decoders as needed.

Decoders are able to recognise individual streams from command streams by comparing the value of the command bytes that are stored in the memory associated with the microprocessor 40.

The second embodiment is of the same general form as the first embodiment. However, in the second embodiment, the decoders 18 are arranged to sink 100 mA of current from the alternating power signal only during a period immediately following a rising edge or falling edge of the alternating power signal. In the embodiment, this period is approximately 0.25 ms for a 400 Hz alternating power signal.

Also, instead of sinking current to impose an 8-bit message on the positive and negative portions of the alternating power signal, the decoder 18 sinks current to impose a single bit on each of the positive and negative portions of the alternating power signal. Thus, the controller 12 receives 2 bits of information from each decoder 18 during an idle stream. These 2 bits are interpreted as follows:

| Bits | Meaning |
| --- | --- |
| 00 | Decoder offline or faulty |
| 01 | Decoder on line, output (solenoid) energised, nothing to report |
| 10 | Decoder on line, nothing to report |
| 11 | Exception - a fault or event has occurred |

A decoder sinks current during an idle pulse corresponding to its address in an idle stream, as described above. In the second embodiment, the decoders are also arranged to sink current during the activation pulse corresponding to its address in a command stream.

If the controller 12 detects that a remote station has a fault condition, it will then poll the remote station using the individual stream. The decoder will then respond by sinking current on the idle pulses following the instruction data in the individual stream. At 2 bits per idle pulse, an 8 bit reply will be received in 32 idle pulses.

The second embodiment is of the same general form as the first embodiment, and like reference numerals are used to denote like parts. The difference between the first embodiment and the second embodiment is that in the second embodiment, when a remote station 14a–14h receives an instruction to activate its solenoid, the microprocessor 40 assigns itself a phase allocation according to the number of remote stations that have been activated before it. In the embodiment, four separate phase allocations are used, with phase one representing 0° following the sync pulse, phase two representing 22.5° following the sync pulse, phase three representing 45° following the sync pulse and phase four representing 67.5° following the sync pulse. If more than four remote stations are activated simultaneously, the fifth station would allocate itself to phase one and so forth.

The solenoids 20 used in the remote stations 14a–14h typically require a 24V 50 Hz AC power supply to activate. As a result, when supplied by an AC square-wave power source the maximum current is drawn by the solenoids at the 179° and 359° points in the AC waveform, and minimum current is drawn at the 0° and 180° points in the AC waveform. If multiple remote stations are active simultaneously and provide power to the solenoids in a single phase, the current draw of the solenoids will become cumulative with a high peak current at the 179° and 359° points in the AC waveform and a relatively low current at the zero crossings of the AC waveform.

To avoid this problem, the system of the second embodiment utilises a power distribution and communication system that allows the decoders 18 to provide power to their solenoids 20 at a different relative phase to other remote stations.

Since a 50 hertz AC power waveform is not provided along the pair of wires 16, the decoders determine their phase as follows.

Upon next receiving a sync pulse, each decoder will count a number of pulses after the sync pulse to determine its phase. In Australia, the solenoids are designed to activate on a 50 Hz AC waveform, and so the reference is 0, 22.5, 45 and 67.5° are relative to a 50 Hz AC waveform. Accordingly, the 0° phase is commenced immediately after the synch pulse, whereas the 22.5° phase is delayed by 1.25 milliseconds, the 45° phase is delayed by 2.5 milliseconds and the 62.5° phase is delayed by 3.75 milliseconds This can be determined by each decoder in a number of ways such as an internal timer, by measuring the width of pulses after the synchronisation pulse, or by counting the number of pulses after the synchronisation pulse. For example, if a 400 hertz frequency is used for the activation pulses, a phase of 22.5 degrees corresponds with two pulses and so forth.

By all of the remote stations synchronising to the synchronisation pulse, long term drift is eliminated. Advantageously, since the remote stations are powering their solenoids at spaced apart timing intervals, their maximum current draw is also spaced apart to better average the power drawn by all of the remote stations from the pair of wires 16. This allows more remote stations to be powered, or alternatively for the length of the pair of wires 16 to be extended without affecting performance.

It should be appreciated that this invention is not limited to the particular embodiments described above.

For example, other phase angles can be used, e.g., 0°, 45°, 90° and 135°. Also, more than four phases can be used, as desired.

Further, the type of modulation employed by the controller 12 and the decoders 18 may be varied without departing from the spirit of the invention. In one such variation, the decoders may sink current in a frequency-shift keying (FSK) manner, and the controller may determine what was sent according to the frequency of the current sink pulses.

What is claimed is:

1. A method for communicating between a first station and a second station over a distribution medium, comprising:
    the first station sending an alternating power signal over the distribution medium, the alternating power signal comprising a plurality of communication symbols;
    the second station receiving the alternating power signal and determining therefrom the plurality of communication symbols;
    the second station drawing current from the alternating power signal in a sequence corresponding to at least one further communication symbol; and
    the first station determining the current drawn in the alternating power signal to recover the at least one further communication symbol.

2. The method of claim 1, wherein the alternating power signal has a substantially square wave-form, and has substantially equal proportions of positive and negative components, averaged over time.

3. The method of claim 2, wherein the second station drawing current comprises the second station drawing current during a positive component and a negative component of the alternating power signal.

4. The method of claim 3, wherein the second station is arranged to draw current during the positive component of the alternating power signal in a sequence corresponding to the at least one further communication symbol, and to repeat the current draw in the negative component of the alternating power signal.

5. The method of claim 3, wherein the second station is arranged to draw current during a substantially centrally located portion of the positive component and negative component of the alternating power signal.

6. The method of claim 3, wherein the second station is arranged to draw current adjacent each rising edge and falling edge of the alternating power signal.

7. The method of claim 1, wherein the second station drawing current further comprises the second station not deriving power from the alternating power signal for other purposes while drawing current corresponding to the at least one further communication symbol.

8. The method of claim 1, wherein the communication symbols comprise '1', '0', 'idle', and 'sync'.

9. The method of claim 8, wherein the '0' symbol is represented by equal portions of positive and negative components in the alternating power signal, and the '1' symbol is represented by unequal portions of positive and negative components in the alternating power signal, and the proportion of positive and negative components in the alternating power signal representing a '1' symbol is alternated each time a '1' symbol is sent.

10. The method of claim 1, wherein the plurality of communication symbols form a stream, selected from one of:
    a command stream comprising a sync symbol, an instruction byte, and a plurality of station instructions;
    an idle stream comprising a sync symbol, and a plurality of idle symbols; and
    an instruction stream, comprising a sync symbol, an instruction byte, a station address, and station data.

11. The method of claim 10, wherein there are a plurality of second stations, each second station having an address, each second station responsive to a station instruction or to station data at a position in the command stream corresponding to its address, and each second station draws current during an idle pulse at a position in the command stream corresponding to its address.

12. The method of claim 11, wherein one said instruction byte corresponds to a second station activate/deactivate instruction, each second station activating or deactivating according to whether a corresponding station instruction is a '1', symbol or a '0', symbol, respectively.

13. The method of claim 12, wherein each second station is arranged to count the number of other second stations that have been activated before it, and to activate at an offset from the sync pulse corresponding to the number of other second stations.

14. The method of claim 1, wherein the first and second stations comprise part of an irrigation system.

15. An apparatus for communicating with at least one station over a distribution medium, comprising:
   means for providing an alternating power signal over the distribution medium, the alternating power signal comprising a plurality of communication symbols; and
   control means arranged to determine current draw in the alternating power signal to recover at least one further communication symbol from a station.

16. The apparatus of claim 15, wherein the means for providing an alternating power signal comprises a power generating circuit connected to and operating under control of the control means, the power generating circuit operable to provide an alternating power signal over the distribution medium.

17. The apparatus of claim 16, wherein the power generating circuit is arranged to provide an alternating power signal that has a substantially square wave-form, and has substantially equal proportions of positive and negative components, averaged over time.

18. The apparatus of claim 16, wherein the control means is arranged to control the power generating circuit to form the alternating power signal from a plurality of communication symbols forming a stream, selected from one of:
   a command stream comprising a sync symbol, an instruction byte, and station instructions;
   an idle stream comprising a sync symbol, and a plurality of idle symbols; and an instruction stream, comprising a sync symbol, an instruction byte, a station address, and station data.

19. The apparatus of claim 15, wherein the communication symbols comprise '1', '0', 'idle', and 'sync'.

20. The apparatus of claim 19, wherein the '0' symbol is represented by equal portions of positive and negative components in the alternating power signal, and the '1', symbol is represented by unequal portions of positive and negative components in the alternating power signal, and the proportion of positive and negative components in the alternating power signal representing a '1' symbol is alternated each time a '1', symbol is sent.

21. The apparatus of claim 15, wherein the control means is arranged to determine current draw during a substantially centrally located portion in each positive component and negative component of the alternating power signal.

22. The apparatus of claim 15, wherein the control means is arranged to determine current draw adjacent each rising edge and falling edge of the alternating power signal.

23. The apparatus of claim 15, wherein the at least one station comprises part of an irrigation system.

24. An apparatus for communicating with a first station over a distribution medium, comprising:
   means for receiving an alternating power signal comprising a plurality of communication symbols over the distribution medium, and for recovering the communication symbols therefrom; and
   control means arranged to draw current from the alternating power signal in a sequence corresponding to at least one further communication symbol.

25. The apparatus of claim 24, wherein the control means is arranged to draw current during a positive component and a negative component of the alternating power signal.

26. The apparatus of claim 24, wherein the control means is arranged to draw current during the positive component of the alternating power signal in a sequence corresponding to the at least one further communication symbol, and to repeat the current draw in the negative portion of the alternating power signal.

27. The apparatus of claim 26, wherein the control means is arranged to draw current during a substantially centrally located section in a positive component and negative component of the alternating power signal.

28. The apparatus of claim 26, wherein the control means is arranged to draw current adjacent each rising edge and falling edge of the alternating power signal.

29. The apparatus of claim 24, wherein the control means is arranged not to derive power from the alternating power signal during a prescribed section other than the current draw.

30. The apparatus of claim 24, wherein the means for recovering is arranged to recover a plurality of communication symbols forming a stream, and to decode the stream into one of:
   a command stream comprising a sync symbol, an instruction byte, and station instructions;
   an idle stream comprising a sync symbol, and a plurality of idle symbols; and
   an instruction stream, comprising a sync symbol, an instruction byte, a station address, and station data.

31. The apparatus of claim 30, wherein the apparatus has an address, the means for recovering being responsive to station instruction and station data at a position in the command stream corresponding to the address, the control means arranged to draw current during an idle pulse at a position in the command stream corresponding to the address.

32. The apparatus of claim 31, wherein the control means is arranged to count the number of other apparatus that have been activated before it, and to activate at an offset from the sync symbol corresponding to the number of other apparatus.

33. The apparatus of claim 24, wherein the first station comprises part of an irrigation system.

34. A method for controlling a plurality of stations, comprising:
   distributing an alternating power signal to the stations via a distribution medium;
   distributing a reference datum to the stations;
   selectively activating a plurality of the stations at different prescribed phase offsets from the reference datum so that one of the activated stations draws power from the alternating signal at a different time than at least one other one of the activated stations;
   sensing a number of activated stations; and
   selecting the prescribed phase offset from a set of prescribed phase offsets according to the number of activated stations to average the power drawn by the activated stations.

35. The method of claim 34, wherein the alternating power signal has a substantially square wave-form of equal amplitude, and has substantially equal proportions of positive and negative components, averaged over time.

36. The method of claim 34, wherein the distributing of a reference datum further comprises distributing a plurality of activation marks after the reference datum.

37. The method of claim 36, wherein the plurality of activation marks comprise a further predetermined sequence of positive and negative components in the alternating power signal after the reference datum.

38. The method of claim 36, wherein the activating of stations comprises sending instructions to each station specifying whether or not to activate the station, the instructions being embedded in the plurality of activation marks.

39. The method of claim 34, wherein the reference datum comprises a predetermined sequence of positive and negative components in the alternating power signal.

40. The method of claim 34, wherein the stations comprise part of an irrigation system.

41. The method of claim 34, wherein the set of prescribed phase offsets comprises phase offsets of 0 degrees, 22.5 degrees, 45 degrees and 67.5 degrees.

42. An apparatus for controlling a plurality of stations connected to the apparatus by a distribution medium, the apparatus comprising:
   means for providing power to the stations via the distribution medium;
   control means arranged to provide a reference datum to the stations and an instruction to instruct each station to activate, each station being responsive to the instruction to activate at a prescribed phase offset from the reference datum so that one of the activated stations draws power at a different time than at least one other one of the activated stations;
   sensing means for sensing a number of activated stations; and
   selecting means for selecting the prescribed phase offset from a set of prescribed phase offsets according to the number of activated stations to average the power drawn by the activated stations.

43. The apparatus of claim 42, wherein the means for providing power comprises a power generating circuit connected to and operating under control of the control means, the power generating circuit operable to provide an alternating power signal of variable frequency over the distribution medium.

44. The apparatus of claim 43, wherein the power generating circuit is arranged to produce an alternating power signal that has a substantially square wave-form, and has substantially equal proportions of positive and negative components, averaged over time.

45. The apparatus of claim 43, wherein the control means is further arranged to provide a plurality of activation marks after the reference datum.

46. The apparatus of claim 45, wherein the control means is arranged to provide the activation marks by controlling the power generating circuit to produce a further predetermined sequence of positive and negative components in the alternating power signal after the reference datum.

47. The apparatus of claim 45, wherein the control means is arranged to provide instructions to each station by controlling the power generating circuit to produce a prescribed sequence of alternating positive and negative components in the alternating power signal as the activation marks, each activation mark corresponding to an instruction to a station whether or not to activate.

48. The apparatus of claim 43, wherein the control means is arranged to provide the reference datum by controlling the power generating circuit to produce a predetermined sequence of positive and negative components in the alternating power signal.

49. The apparatus of claim 42, wherein the stations comprise part of an irrigation system.

50. The apparatus of claim 42, wherein the set of prescribed phase offsets comprises phase offsets of 0 degrees, 22.5 degrees, 45 degrees and 67.5 degrees.

51. An apparatus for communicating with at least one station over a distribution medium, comprising:
   a power generating device for providing an alternating power signal over the distribution medium, the alternating power signal comprising a plurality of communication symbols; and
   a control device arranged to determine current draw in the alternating power signal to recover at least one further communication symbol from a station.

52. The apparatus of claim 51, wherein the at least one station comprises part of an irrigation system.

53. An apparatus for communicating with a first station over a distribution medium, comprising:
   a receiver for receiving an alternating power signal comprising a plurality of communication symbols over the distribution medium, and for recovering the communication symbols therefrom; and
   a control device arranged to draw current from the alternating power signal in a sequence corresponding to at least one further communication symbol.

54. The apparatus of claim 53, wherein the first station comprises part of an irrigation system.

55. An apparatus for controlling a plurality of stations connected to the apparatus by a distribution medium, the apparatus comprising:
   a power generating device for providing power to the stations via the distribution medium;
   a control device arranged to provide a reference datum to the stations and an instruction to instruct each station to activate, each station being responsive to the instruction to activate at a prescribed phase offset from the reference datum so that one of the activated stations draws power at a different time than at least one other one of the activated stations;
   a sensing device for sensing a number of activated stations; and
   a selecting device for selecting the prescribed phase offset from a set of prescribed phase offsets according to the number of activated stations to average the power drawn by the activated stations.

56. The apparatus according to claim 55, wherein the stations comprise part of an irrigation system.

57. The apparatus of claim 55, wherein the set of prescribed phase offsets comprises phase offsets of 0 degrees, 22.5 degrees, 45 degrees and 67.5 degrees.

* * * * *